United States Patent
Zhu et al.

(10) Patent No.: US 9,426,618 B2
(45) Date of Patent: Aug. 23, 2016

(54) USER PLANE LOCATION SERVICES OVER SESSION INITIATION PROTOCOL (SIP)

(71) Applicants: Yinjun Zhu, Sammamish, WA (US); Gordon John Hines, Kirkland, WA (US); Roger Marshall, Auburn, WA (US); Fei Yang, Odenton, MD (US); Victor Burton, Bellevue, WA (US)

(72) Inventors: Yinjun Zhu, Sammamish, WA (US); Gordon John Hines, Kirkland, WA (US); Roger Marshall, Auburn, WA (US); Fei Yang, Odenton, MD (US); Victor Burton, Bellevue, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/947,856

(22) Filed: Nov. 20, 2015

(65) Prior Publication Data
US 2016/0080900 A1 Mar. 17, 2016

Related U.S. Application Data

(63) Continuation of application No. 14/747,148, filed on Jun. 23, 2015, now Pat. No. 9,197,992, which is a continuation of application No. 14/201,283, filed on Mar. 7, 2014, now Pat. No. 9,088,614, which is a continuation-in-part of application No. 13/775,670, filed on Feb. 25, 2013, now Pat. No. 8,798,572, which is a continuation of application No. 13/064,203, filed on Mar. 10, 2011, now Pat. No. 8,385,881, which is a continuation of application No. 11/819,262, filed on Jun. 26, 2007, now Pat. No. 7,912,446, which is a continuation of application No. 11/638,548, filed on Dec. 14, 2006, now abandoned, said application No. 14/201,283 is a continuation of application No. 10/836,330, filed on May 3, 2004, now Pat. No. 7,260,186, and a continuation of application No. 10/739,292, filed on Dec. 19, 2003, now Pat. No. 6,940,950.

(60) Provisional application No. 60/555,305, filed on Mar. 23, 2004, provisional application No. 60/861,267, filed on Nov. 28, 2006.

(51) Int. Cl.
| | |
|---|---|
| H04W 4/02 | (2009.01) |
| H04M 3/42 | (2006.01) |
| H04M 7/00 | (2006.01) |
| H04W 12/08 | (2009.01) |
| H04W 4/22 | (2009.01) |
| H04W 64/00 | (2009.01) |
| H04L 12/58 | (2006.01) |
| H04L 29/06 | (2006.01) |
| H04L 29/08 | (2006.01) |

(52) U.S. Cl.
CPC ............ *H04W 4/02* (2013.01); *H04L 12/5815* (2013.01); *H04L 51/043* (2013.01); *H04L 65/1006* (2013.01); *H04L 67/18* (2013.01); *H04M 3/42348* (2013.01); *H04M 7/006* (2013.01); *H04W 4/22* (2013.01); *H04W 12/08* (2013.01); *H04W 64/00* (2013.01); *H04W 64/003* (2013.01); *H04L 12/581* (2013.01); *H04L 51/04* (2013.01); *H04L 63/0209* (2013.01); *H04L 65/1096* (2013.01); *H04L 67/04* (2013.01); *H04M 2207/18* (2013.01); *H04M 2242/04* (2013.01); *H04M 2242/30* (2013.01)

(58) Field of Classification Search
None
See application file for complete search history.

(56) References Cited

U.S. PATENT DOCUMENTS 9,197,992 B2 * 11/2015 Zhu ..................... H04L 12/5815

(Continued)

*Primary Examiner* — Brian Roberts
(74) *Attorney, Agent, or Firm* — Tarolli, Sundheim, Covell & Tummino LLP

(57) ABSTRACT

A method and mechanism to allow a location server to initiate a user plane location service (e.g., SUPL defined by OMA) procedure to a user plane enabled device via Instant Messaging, or alternatively, via an existing SIP session if a multimedia session is already established. The location request is signaled to the user plane enabled device via a SIP INFO message. The location request uses SIP messaging to overcome firewall and other network security issues. Location using SUPL over SIP may be provided about a caller making an E911 emergency call. An Instant Message may be sent to the user plane enabled device, e.g., a VoIP wireless phone.

20 Claims, 5 Drawing Sheets

BASIC CALL FLOW OF USER PLANE LOCATION SERVICE OVER SIP

(56) References Cited

U.S. PATENT DOCUMENTS

| | | | |
|---|---|---|---|
| 2005/0119012 A1* | 6/2005 | Merheb | H04W 4/02 455/456.3 |
| 2006/0293066 A1* | 12/2006 | Edge | H04W 4/02 455/456.3 |
| 2007/0026871 A1* | 2/2007 | Wager | H04W 4/02 455/456.1 |
| 2007/0060097 A1* | 3/2007 | Edge | H04L 65/4007 455/404.1 |
| 2007/0149213 A1* | 6/2007 | Lamba | H04W 4/02 455/456.1 |

* cited by examiner

USE CASE – SUPPORT FOR MID-CALL LOCATION UPDATE DURING AN EMERGENCY CALL

TYPICAL OMA SUPL CALL FLOW

USER PLANE LOCATION SERVICES OVER SESSION INITIATION PROTOCOL (SIP)

RELATED APPLICATIONS

The present application is a continuation application claiming priority from U.S. patent application Ser. No. 14/747148, filed 23 Jun. 2015, which is a continuation of U.S. application Ser. No. 14/201283, filed 7 Mar. 2014 (now U.S. Pat. No. 9,088,614, issued on 21 Jul. 2015); which is a continuation-in-part of U.S. application Ser. No. 13/775670, filed 25 Feb. 2013 (now U.S. Pat. No. 8798572, issued on 5 Aug. 2014), which is a continuation of U.S. application Ser. No. 13/064203, filed 10 Mar. 2011 (now U.S. Pat. No. 8,385,881, issued on 26 Feb. 2013), which is a continuation of U.S. application Ser. No. 11/819262, filed 26 Jun. 2007 (now U.S. Pat. No. 7,912,446, issued on 22 Mar. 2011), which is a continuation of U.S. application Ser. No. 11/638548, filed 14 Dec. 2006 (abandoned), which claims priority from U.S. Provisional Application No. 60/861267, filed 28 Nov. 2006 (expired), and is a continuation of U.S. application Ser. No. 10/836330, filed 3 May 2004 (now U.S. Pat. No. 7,260,186, issued on 21 Aug. 2007), which claims priority from U.S. Provisional Application No. 60/555305, filed 23 Mar. 2004 (expired), and is a continuation of U.S. application Ser. No. 10/739292, filed 19 Dec. 2003 (now U.S. Pat. No. 6,940,950, issued on 6 Sep. 2005), the entirety of all of which is incorporated herein by reference.

BACKGROUND OF THE INVENTION

1. Field of the Invention

This invention relates generally to wireless and long distance carriers, Internet Service Providers (ISPs), and information content delivery services/providers and long distance carriers. More particularly, it relates to location services for the wireless industry.

2. Background of Related Art

Location information regarding subscribers is becoming increasingly available in a wireless network. Location information relates to absolute coordinates of a wireless device.

FIG. 4 shows a conventional LoCation Services (LCS) request.

In particular, as shown in FIG. 4, a location server 106 requests location information regarding a particular mobile subscriber (MS) from a core network node, e.g., from a Mobile Switch Center (MSC) 110. Requested information regarding a particular wireless device (MS) may include, e.g., attach, detach, and location area update. The location server 106 may also request information regarding the wireless device such as attach, detach and/or location area update from a Packet Data Node (e.g., SGSN, GGSN, or PDSN), or help the device calculate x/y direction. Typically, location information regarding a particular wireless device is requested of a home location register (HLR).

As shown in step 1 of FIG. 4, a locations services client 104 sends a message to a location server 106.

In step 2, the location server 106 sends a Provide Subscriber Info message to a Home Location Register 108, requesting subscriber information regarding a particular subscriber.

In step 3, the carrier's Home Location Register (HLR) 108 provides the subscriber information for the requested subscriber back to the location server 106.

In step 4, location information regarding the requested subscriber is requested to either an MSC or Packet Data node 110. The MSC or Packet Data Node preferably provides precise location information using, e.g., a global positioning satellite (GPS), triangulation techniques, or other relevant locating technology, or helps the device calculate X/Y direction.

In step 5, the location request is forwarded to the Radio Access Network (RAN) 112 if needed.

In step 6, precise, updated location information regarding the requested subscriber is sent to the location server (LS) 106.

In step 7, an ultimate response to the original location request is sent to the LCS client 104 that initially requested the location information.

Secure User Plane for Location (SUPL) is a standards-based protocol that has been developed to allow a mobile handset client to communicate with a location server, e.g., as shown in step 1 of FIG. 4. The SUPL specification is defined by the Open Mobile Alliance (OMA) standards working group. Refer to OMA Secure User Plane Location Architecture document, OMA-AD-SUPL-V1.sub.--0-20060127-C for more details on OMA SUPL call flows; and OMA User Plane Location Protocol document, OMA-TS-ULP-V1.sub.--0-20060127-C. The OMA SUPL Version 1 specifies two basic types call flows: (1) a SUPL network initiated (NI) call flow, and (2) a SUPL set initiated (SI) call flow. According to the SUPL standard, a session ID has a unique value consisting of server and handset portions.

FIG. 5 shows typical OMA mobile terminated call flow for a SUPL location request initiated by a SUPL agent.

In particular, as shown in FIG. 5, messages are passed between a SUPL agent 802 residing in the network, a sat reference server 804, a SUPL server 806, a PPG 808, and a SUPL terminal (SET) 812.

The SUPL server (or SUPL location platform (SLP)) 806 comprises a SUPL location center (SLC) and SUPL positioning center (SPC). A mobile device is generalized in FIG. 5 as a SUPL enabled terminal (SET) 812. The SLC coordinates operations of SUPL communications in the network, and controls the SPC component. The SPC Provides global positioning system (GPS) assistance data to the SUPL enabled terminal (SET) 812, and performs precise position calculation of a SET 812.

Network initiated location requests 820 arrive at the SUPL server 806 via an MLP interface. The SUPL server 806 processing this network initiated request is required to send a trigger message (SUPL INIT message) 822 to the SET 812 for validating and initiating a SUPL positioning session 828. The trigger message 822 is sent to the SET 812 as a push message 824 from the PPG 808 (or as an SMS message from an SMSC/MC). At that point, the SET 812 needs to establish a secure TCP/IP connection to the SUPL server 806 to respond to the SUPL positioning request.

For network initiated end-to-end IP based location services, when a location server needs to find out contact information (e.g. an IP address) of a given target, the location server sends a trigger to the target to allow the target to establish a session with the location server. Conventional IP based user plane location services (e.g., OMA SUPL) are built upon WAP Push/SMS messaging and TCP as a transport protocol for initiating a mobile terminating positioning procedure.

There are some scenarios where conventional use of User Plane Location Services does not work or does not work well.

For example, in one scenario where a target device has Internet access via, e.g. WLAN, LAN, or DSL, it may not be possible for the location server to initiate location by use of an SMS, WAP Push. This is particularly true if the location server cannot determine the IP address of the target device, and the network to which the target device attaches does not support correct inter-working with SMS or WAP Push messaging.

A second example relates to Voice over IP (VoIP) based emergency calling (there are some variances in the wireless industry, e.g., IMS emergency in the 3GPP standard and MMD emergency in the 3GPP2 standard, referred to generally as a SIP call by the IETF.) This scenario depicts an emergency call which has already established a SIP session with the serving network. During the emergency call, the appropriate Public Safety Answering Point (PSAP) may require updated location information relating to the emergency caller.

The present inventors appreciate that the existing mechanism of using WAP Push/SMS messaging may not be efficient and reliable, as WAP Push/SMS messaging is built upon store-and-forward mechanisms. In other words, there is no guarantee that the trigger of a location service request will be delivered to a target before the emergency call ends.

SUMMARY OF THE INVENTION

The present invention introduces a method and a mechanism that allows a location server to initiate a user plane location service (e.g., SUPL) procedure to a user plane enabled device via Instant Messaging, or alternatively, via an existing SIP session if a multimedia session is already established.

In accordance with one aspect of the invention, a method and apparatus for obtaining a location of a caller comprises initiating a user plane location service procedure. If a session initiation protocol (SIP) session already exists, a location request is signaled to a user plane enabled caller device via session initiation protocol (SIP).

A method and apparatus for obtaining a location of a caller in accordance with another aspect of the invention comprises determining if a multimedia session is already established with a caller. If a multimedia session is already established with the caller, updated location information of the caller is obtained via an existing session initiation protocol (SIP) session.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention introduces a method and a mechanism that allows a location server to initiate the user plane location service procedure to a user plane enabled device via Instant Messaging, or alternatively, via an existing SIP session if a multimedia session is already established.

Session Initiation Protocol (SIP) is an Internet Engineering Task Force (IETF) standard protocol for initiating an interactive user session that involves multimedia elements such as video, voice, chat, gaming, virtual reality, etc. SIP is specified in IETF Request for Comments (RFC) 3261 (replacing 2543). Like HTTP or SMTP, SIP works in the application layer of the open systems interconnection (OSI) communications model. SIP can also be used to invite participants to sessions that do not necessarily involve the initiator. Because SIP supports name mapping and redirection services, it makes it possible for users to initiate and receive communications and services from any location, and for networks to identify the users wherever they are. SIP is a request-response protocol dealing with requests from clients and responses from servers. Participants are identified by SIP universal resource locators (URLs). Requests can be sent through any transport protocol, such as UDP, SCTP, or TCP. SIP determines the end system to be used for the session, the communication media and media partners, and the called party's desire to engage in the communication. Once these are assured, SIP establishes call parameters at either end of the communication, and handles call transfer and termination.

Figure 1:
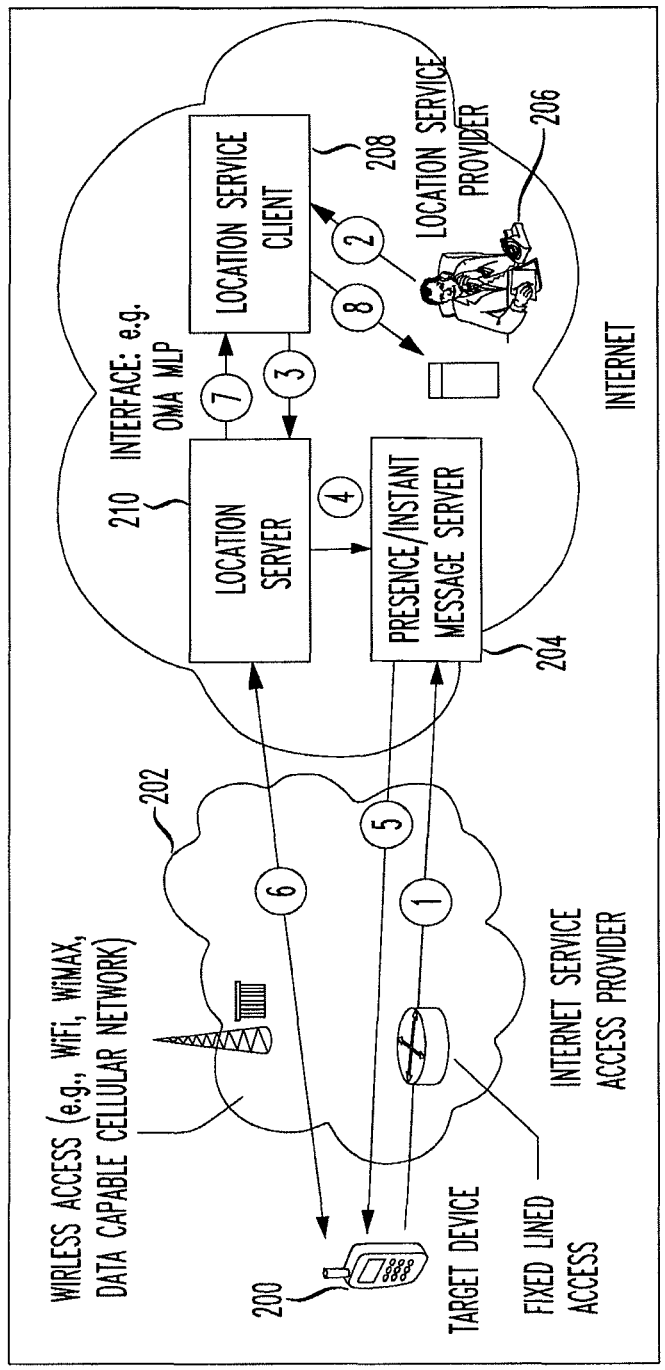
FIG. 1 illustrates a high level message flow where User Plane Location Service uses SIP based signaling as the transport, in accordance with the principles of the present invention.

FIG. 1 illustrates a high level message flow where User Plane Location Service uses SIP based signaling as the transport, in accordance with the principles of the present invention.

In particular, as shown in FIG. 1, the general service description is described as follows:

In step 1 of FIG. 1, a location service enabled device 200 has successfully granted Internet access from an Internet Service Access Provider 202, via either fixed lined access (e.g., dial-up, DSL, cable or LAN) or wireless access using one of the following (but not limited): Wireless LAN (MAN) that is built based on IEEE 802.11x; Wireless personal area network (WPAN) that is built based on IEEE 802.15 (also referred to as BLUETOOTH™); Worldwide Interoperability for Microwave Access (WiMAX) or Wireless metropolitan area network (WMAN), which is built based on IEEE 802.16; Third generation (3G) packet data access technologies based on UMTS or 1xEVDO, or the enhanced technologies, e.g. High Speed Downlink Packet Access (HSDPA); packet data access over satellite; or High speed packet data access over speed point-to-point optical link, e.g. built based on IEEE 802.17.

The location service enabled device 200 then initiates the necessary registration of presence service per RFC2778, 2779 and 3856. Upon registration to the presence service, the device contact information including networking information (e.g. IP address) etc. is stored in a presence server 204.

In step 2, a request for location information of the location service enabled device 200 is generated by a location service provider 206. The location request may be generated by an application in the network that uses the location information, e.g., a weather report based on location; or by an application that resides in the end user terminal.

In step 3, the corresponding location service client 208 sends a location request to a location server 210 for the target device 200 specified by one of the following identifiers, together with other criteria: MSISDN; IMSI; MSN; MIN; IP address; SIP URI; TEL URI; or XMPP URI.

In step 4, upon receiving the location request, the location server 210 examines the identifier(s) of the target device 200 and determines that the target device 200 is not in a conventional mobile network (e.g., packet data enabled cellular network). The location server 210 then initiates an Instant Message containing the information needed to trigger the user plane location service procedure to the presence/Instant Message server 204. The location server 210 may retrieve the SIP URI, XMPP URI or TEL URI of the target device 200 based on the received identifier other than SIP URI, XMPP URI or TEL URI from other network entities, e.g., HLR/HSS in the cellular networks.

In step 5, based on the registration information, the presence/Instant Message server 204 forwards the Instant Message to the target device 200 via SIP. In the disclosed embodiments, the Instant Message can be sent over the existing SIP session if there is an existing SIP session established between the target device 200 and the presence/Instant Message server 204.

In step 6, upon receipt of the Instant Message containing information necessary for trigging the User Plane Location Service procedure, the target device 200 initiates a User Plane Location Service session with the location server 210. The User Plane Location Service signaling can either use standard TCP/IP or UDP/IP, or use standard SIP signaling as the transport. Using SIP signaling as the transport has some advantage when there are security entities (e.g. firewalls) involved in the networks, where direct IP connectivity with certain ports is not accessible. Upon completion of the User Plane Location Service procedure, the location server 210 retrieves a location fix of the target device 200.

In step 7, the location server 210 returns the retrieved location fix to the location service client 208.

In step 8, the location service client 208 sends the location information back to the location service application.

Figure 2:
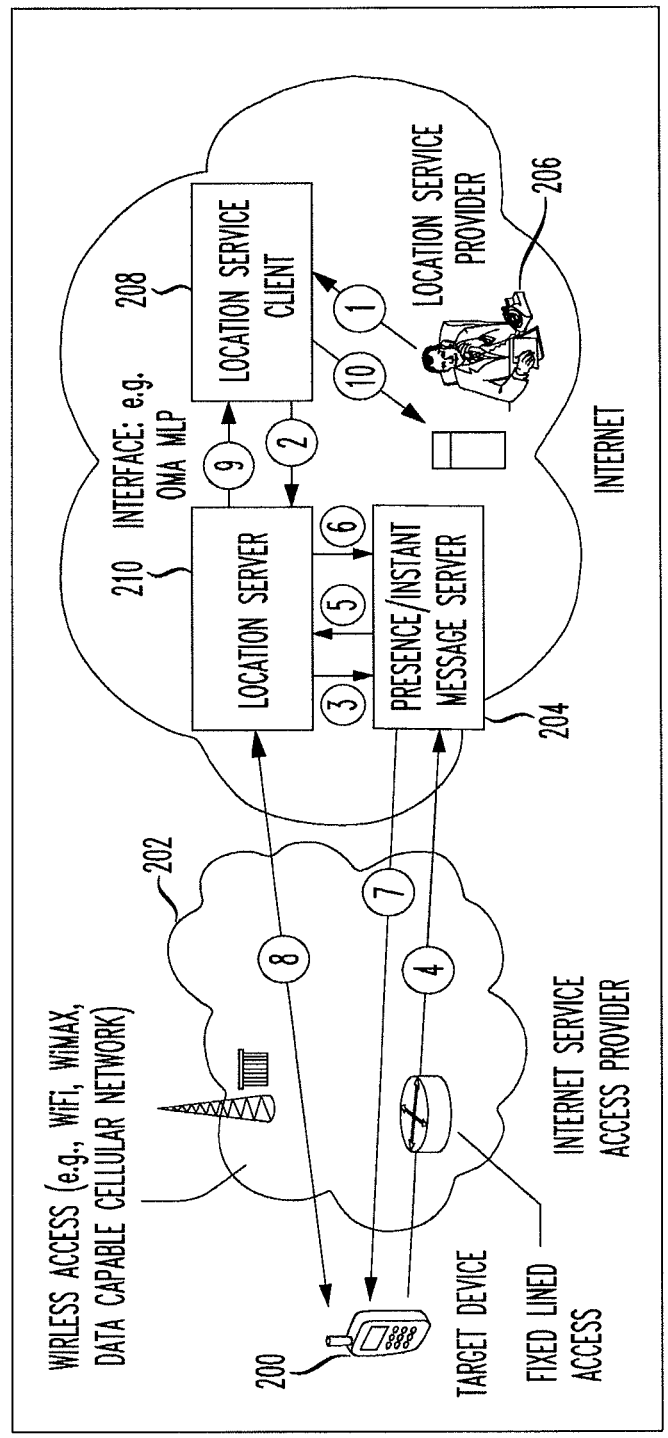
FIG. 2 illustrates a variance of the User Plane Location Service procedure where a location server acts as a watcher of the location service and initiates a location retrieval procedure only when the target device is on-line, in accordance with the principles of the present invention.

FIG. 2 illustrates a variance of the User Plane Location Service procedure where a location server 210 acts as a watcher of the Presence Service 210 and initiates a location retrieval procedure only when the target device 200 is on-line, in accordance with the principles of the present invention.

The procedure shown and described with respect to FIG. 2 may be implemented as the primary procedure for a User Plane Location Service. Alternatively, it can be implemented as a fallback procedure to the call flow shown and described with respect to FIG. 1.

The general service description shown in FIG. 2 is described as follows:

In step 1, a request for location information of the location service enabled device 200 is generated by a location service provider 206. The location request may be generated by an application in the network that uses the location information, e.g., a weather report based on location; or by an application that resides in the end user terminal.

In step 2, the corresponding location service client 208 sends a location request to a location server 210 for the target device 200 specified by one of the following identifiers, together with other criteria: MSISDN; IMSI; MSN; MIN; IP address; SIP URI; TEL URI; or XMPP URI.

In step 3, upon receipt of the location request message, the location server 210 examines the identifier(s) of the target device 200 and determines that the target device 200 is not being served by a conventional mobile network (e.g., packet data enabled cellular network). The location server 210 then initiates a request to the presence/Instant Message server 204, to obtain presence related information of the target device 200. Alternatively the location server 210 may try a conventional mobile network path using the existing WAP Push/SMS mechanism and the inventive mechanisms disclosed herein either in parallel or in an order. For example, the target device supports multiple access technologies and networks.

In step 4, the target device 200 becomes available and sends a status update to the presence/Instant Message server 204.

In step 5, the presence/Instant Message server 204 sends a notification containing the contact information for the target device 200. The contact information may include, e.g., an IP address of the target device 200.

In step 6, optionally, the location server 210 initiates an Instant Message containing the information needed to trigger the user plane location service procedure to the presence/Instant Message server 204.

In step 7, based on the registration information, the presence/Instant Message server 204 forwards the Instant Message to the target device 200 via SIP. In the disclosed embodiments, the Instant Message can be sent over the existing SIP session if there is an existing SIP session established between the target device 200 and the presence/Instant Message server 204.

In step 8, upon receipt of the Instant Message containing information necessary for trigging the User Plane Location Service procedure, the target device 200 initiates a User Plane Location Service session with the location server 210. The User Plane Location Service signaling can either use standard TCP/IP or UDP/IP, or use standard SIP signaling as the transport. Using SIP signaling as the transport has some advantage when there are security entities (e.g. firewalls) involved in the networks, where direct IP connectivity with certain ports is not accessible. Upon completion of the User Plane Location Service procedure, the location server 210 retrieves a location fix of the target device 200.

In step 9, the location server 210 returns the retrieved location fix to the location service client 208.

In step 10, the location service client 208 sends the location information back to the location service application.

Figure 3:
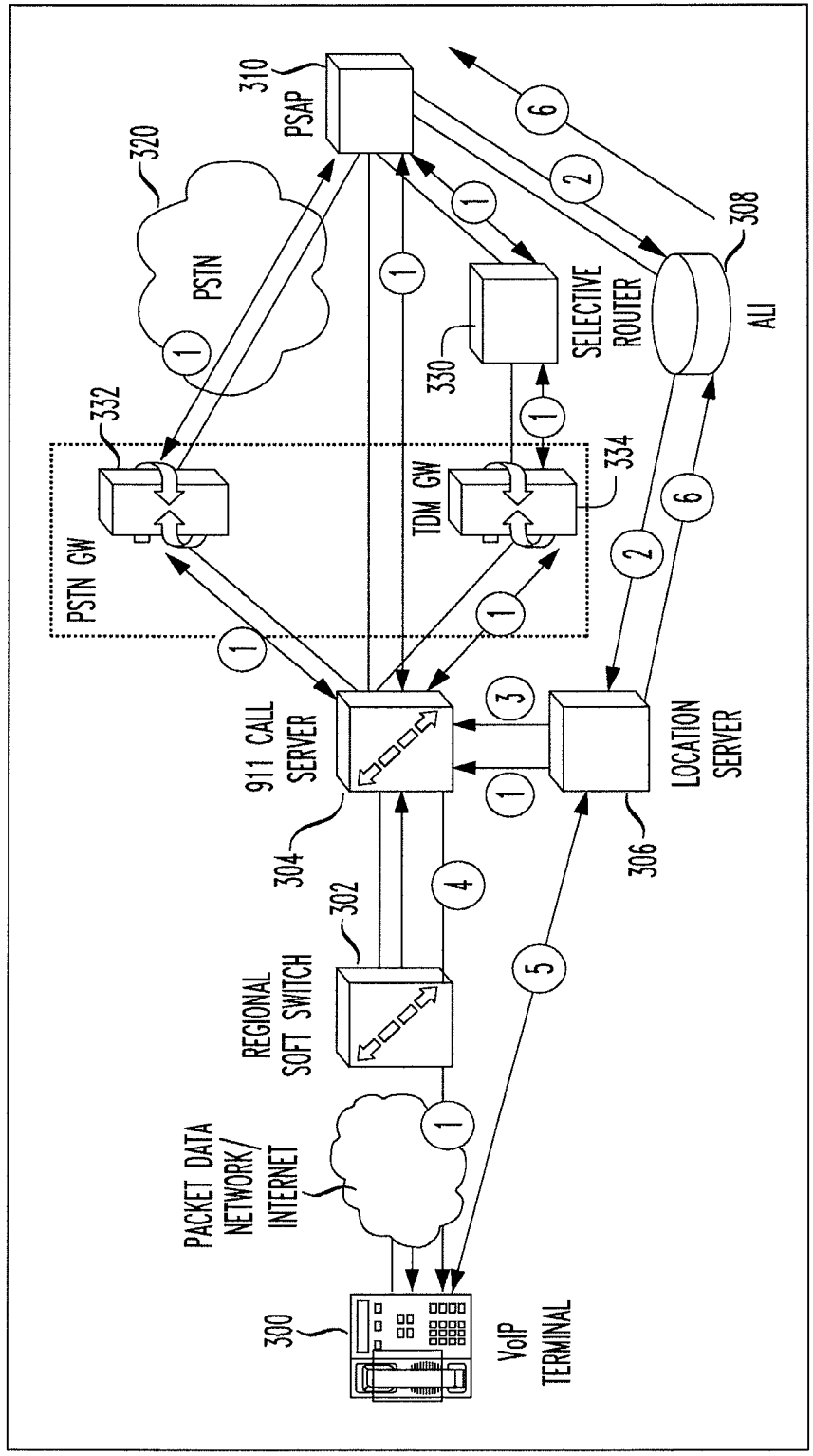
FIG. 3 illustrates another use case where the solution of User Plane Location Service over SIP is used to retrieve the updated location of a VoIP emergency caller, in accordance with the principles of the present invention.
Figure 4:
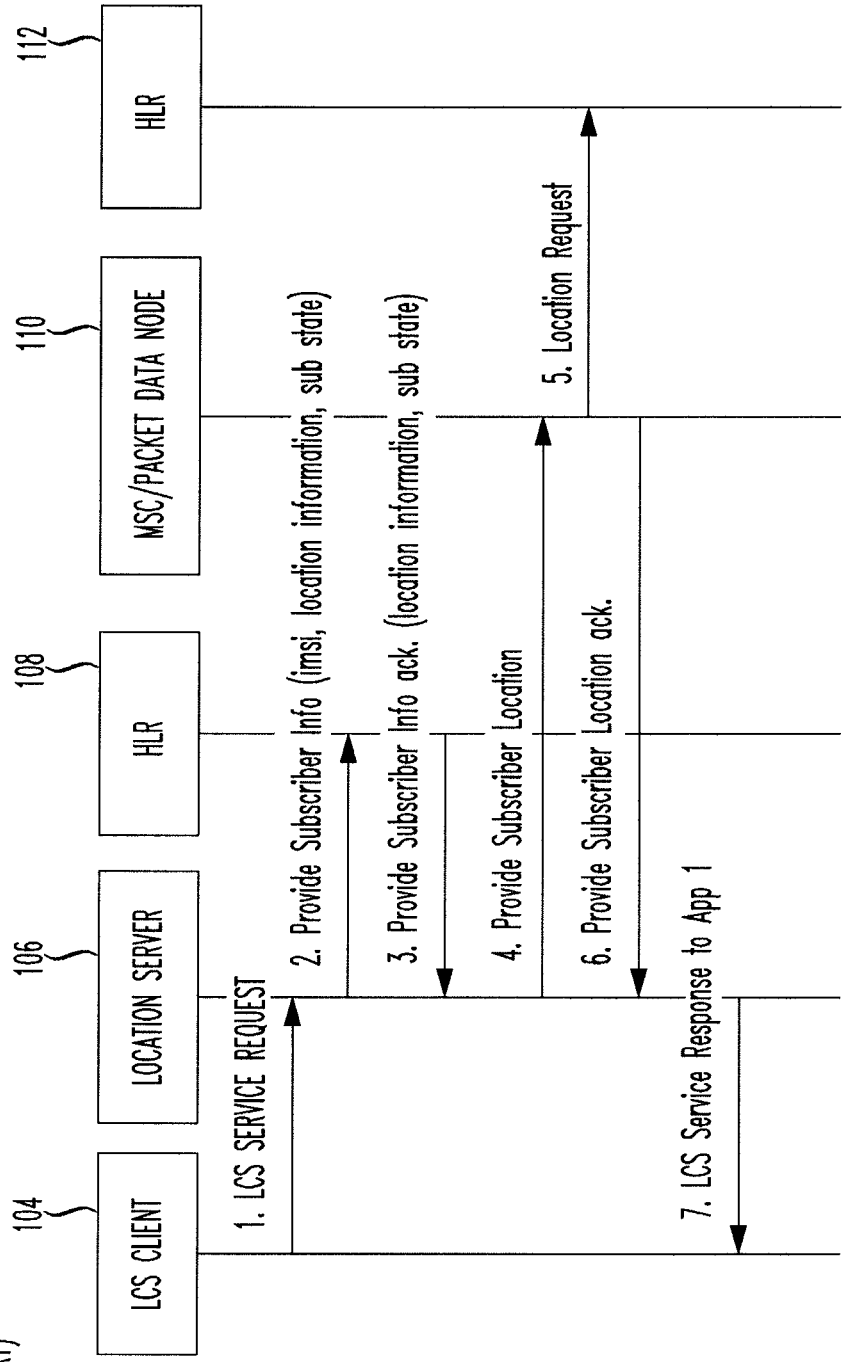
FIG. 4 shows a conventional LoCation Services (LCS) request.
Figure 5:
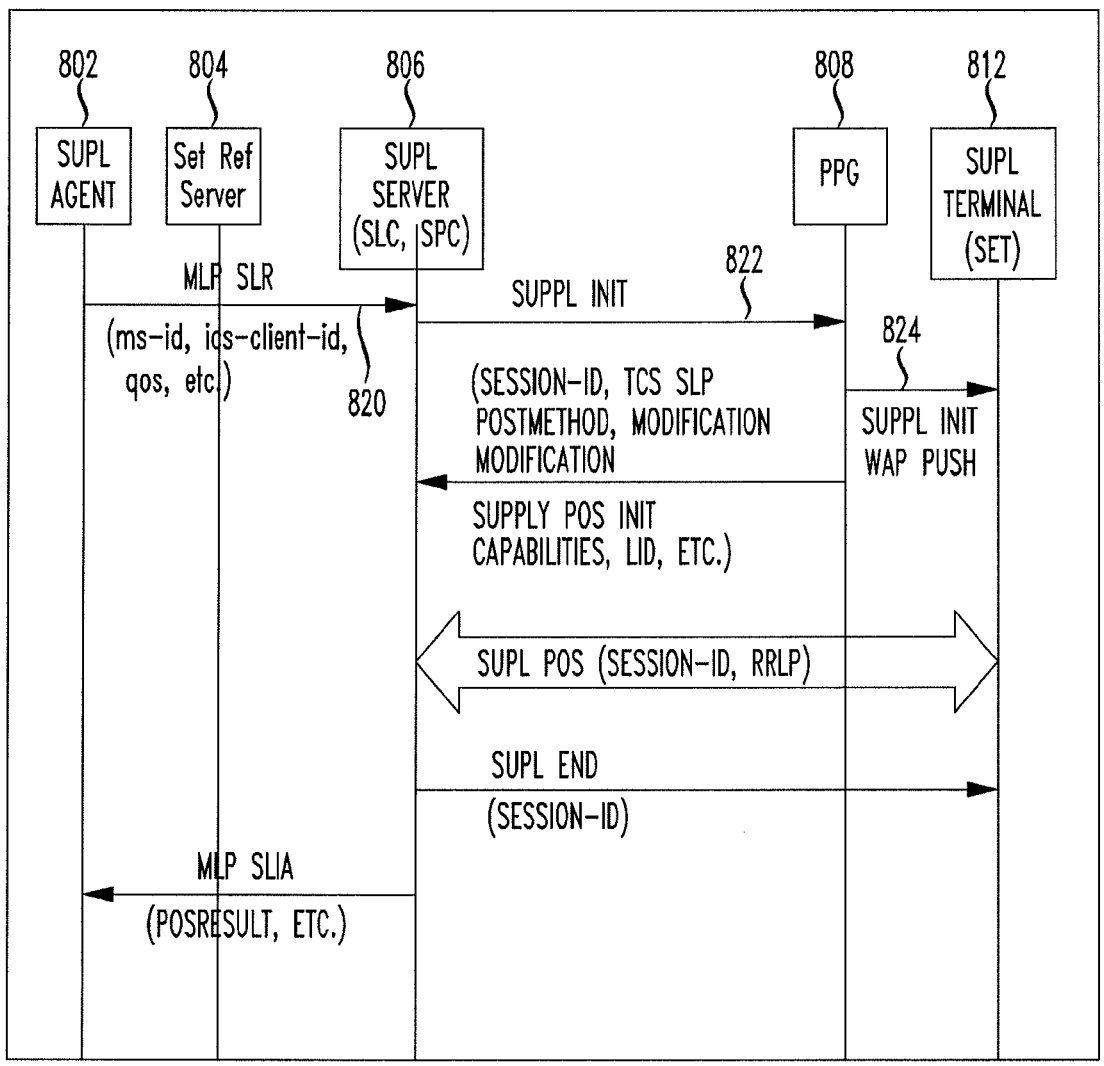
FIG. 5 shows typical OMA mobile terminated call flow for a SUPL location request initiated by a SUPL agent.

FIG. 3 illustrates another use case where a User Plane Location Service over SIP is used to retrieve updated location information regarding a voice over Internet protocol (VoIP) emergency caller, in accordance with the principles of the present invention.

The general service description shown in FIG. 3 is described as follows:

In step 1 of FIG. 3, a VoIP based emergency call is initiated from a VoIP terminal 300, via either fixed line access (e.g., dial-up, digital subscriber loop (DSL), cable or local area network (LAN)), or wireless access using one of the following (but not limited): Wireless LAN (WLAN) that is built based on IEEE 802.11x; Wireless personal area network (WPAN) that is built based on IEEE 802.15 (also referred to as BLUETOOTH™); Worldwide Interoperability for Microwave Access (WiMAX) or Wireless metropolitan area network (WMAN), which is built based on IEEE 802.16; Third generation (3G) packet data access technologies based on UMTS or 1xEVDO, or the enhanced technologies, e.g. High Speed Downlink Packet Access (HSDPA); packet data access over satellite; or High speed packet data access over speed point-to-point optical link, e.g. built based on IEEE 802.17.

The VoIP emergency call is established with an appropriate Public Safety Answering Point (PSAP) 310 through the public switched telephone network (PSTN) 320, selective router network 330, or direct session Internet Protocol (SIP) based network from the emergency 911 call server 304.

In step 2, during the VoIP emergency call, the PSAP 310 requests an updated location of the VoIP emergency caller 300.

In step 3, if the location server 210 is in the SIP call signaling path, it initiates a trigger message using the User Plane Location Service embedded in a SIP INFO message to the E911 call server 304.

In step 4, the SIP INFO message is forwarded to the VoIP emergency caller 300.

In step 5, upon receipt of the trigger message using a User Plane Location Service, the VoIP terminal 300 from which the VoIP emergency call was initiated starts a User Plane Location Service procedure with the location server 306.

In step 6, the location server 306 returns retrieved location information to the PSAP 310.

While the invention has been described with reference to the exemplary embodiments thereof, those skilled in the art will be able to make various modifications to the described embodiments of the invention without departing from the true spirit and scope of the invention.

What is claimed is:

1. A method comprising:
    receiving, at a location server, a location request for a particular wireless device;
    generating, at the location server, an instant message for the particular wireless device in response to receiving the location request; and
    receiving, at the location server, location information for the particular wireless device via a User Plane Location Services session, wherein the location information is provided from the particular wireless device in response to receipt of the instant message.

2. The method of claim 1, further comprising:
    sending, by the location server, the instant message to an instant message server, wherein the instant message server forwards the instant message to the particular wireless device.

3. The method of claim 1, further comprising:
    receiving, at the location server, a request to establish the User Plane Location Services session via an established Session Initiation Protocol (SIP) session.

4. The method of claim 1, further comprising:
    receiving, at the location server, a request to establish the User Plane Location Services session via an Extensible Messaging and Presence Protocol (XMPP).

5. The method of claim 1, wherein the instant message is a short message service (SMS) message.

6. The method of claim 1, further comprising:
    determining, at the location server, in response to receipt of the location request that the particular wireless device is not being served by a packet data enabled cellular network.

7. The method of claim 6, wherein the determination is made based on an identifier of the particular wireless device included in the location request.

8. The method of claim 1, wherein the instant message includes information to trigger the User Plane Location Services session.

9. The method of claim 1, further comprising:
    querying, by the location server, a home location register for a uniform resource identifier of the particular wireless device.

10. The method of claim 1, wherein the location request for the particular wireless device includes an Internet Protocol (IP) address of the particular wireless device.

11. The method of claim 1, further comprising:
    sending, by the location server, a request for presence information of the particular wireless device to an instant message server.

12. The method of claim 11, further comprising:
    receiving, at the location server, a notification containing contact information for the particular wireless device that is provided in response to the request for presence information.

13. A location server comprising:
    a memory configured to store machine readable instructions; and
    at least one processor configured to access the memory and execute the machine readable instructions, the machine readable instructions being configured to:
        generate an instant message for a particular wireless device in response to receiving a location request for the particular wireless device;
        provide the instant message to an instant message server for delivery to the particular wireless device; and
        receive location information for the particular wireless device via a User Plane Location Services session, wherein the location information is provided from the particular wireless device in response to receipt of the instant message.

14. The location server of claim 13, wherein the machine readable instructions are further configured to:
    receive a request to establish the User Plane Location Services session via an established Session Initiation Protocol (SIP) session.

15. The location server of claim 13, wherein the instant message is a short message service (SMS) message.

16. The location server of claim 13, wherein the machine readable instructions are further configured to:
    determine, based on data included in the location request, that the particular wireless device is not being served by a packet data enabled cellular network.

17. A method comprising:
    receiving, at a wireless device, an instant message that includes information for triggering a User Plane Location Services procedure;
    initiating, by the wireless device, a User Plane Location Services session with a location server in response to receipt of the instant message; and
    providing, from the wireless device, location information characterizing a current location of the wireless device to the location server via the User Plane Location Services session.

18. The method of claim 17, wherein the instant message is a Short Message Services (SMS) Message.

19. The method of claim 17, wherein the initiation of the User Plane Location Services is sent via a Session Initiated Protocol (SIP) session.

20. The method of claim 17, further comprising:
    establishing, by the wireless device, Internet access for the wireless device with an Internet Service Provider.

* * * * *